(12) United States Patent
LeCrone et al.

(10) Patent No.: US 9,971,529 B1
(45) Date of Patent: May 15, 2018

(54) SELECTIVE DATA REPLICATION

(71) Applicant: EMC IP Holding Company LLC, Hopkinton, MA (US)

(72) Inventors: Douglas E. LeCrone, Hopkinton, MA (US); Paul A. Linstead, Shrewsbury, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days. days.

(21) Appl. No.: 15/198,684

(22) Filed: Jun. 30, 2016

(51) Int. Cl.
G06F 12/00 (2006.01)
G06F 3/06 (2006.01)
G06F 13/00 (2006.01)

(52) U.S. Cl.
CPC .......... G06F 3/0619 (2013.01); G06F 3/065 (2013.01); G06F 3/067 (2013.01)

(58) Field of Classification Search
CPC ......... G06F 3/0619; G06F 3/065; G06F 3/067
See application file for complete search history.

(56) References Cited

U.S. PATENT DOCUMENTS

| 5,375,232 | A | * | 12/1994 | Legvold | G06F 11/1466 707/999.2 |
| 5,544,347 | A | | 8/1996 | Yanai et al. | |
| 5,742,792 | A | | 4/1998 | Yanai et al. | |
| 6,308,284 | B1 | * | 10/2001 | LeCrone | G06F 11/2064 714/3 |
| 6,954,835 | B1 | | 10/2005 | LeCrone et al. | |
| 6,968,369 | B2 | | 11/2005 | Veprinsky et al. | |
| 6,986,009 | B1 | | 1/2006 | LeCrone et al. | |
| 7,054,883 | B2 | | 5/2006 | Meiri et al. | |
| 7,707,186 | B2 | | 4/2010 | LeCrone et al. | |
| 8,285,850 | B1 | * | 10/2012 | Jones | H04L 47/22 709/227 |
| 9,720,665 | B2 | * | 8/2017 | Chan | G06F 17/3053 |
| 9,733,846 | B1 | * | 8/2017 | Wigmore | G06F 3/0619 |
| 2007/0078972 | A1 | * | 4/2007 | Yagishita | G06F 3/0605 709/224 |
| 2007/0143097 | A1 | * | 6/2007 | Brunet | G06F 11/1451 703/23 |
| 2008/0034016 | A1 | * | 2/2008 | Cisler | G06F 11/1466 |

* cited by examiner

Primary Examiner — Mark A Giardino, Jr.
(74) Attorney, Agent, or Firm — Muirhead and Saturnelli, LLC

(57) ABSTRACT

Described are data replication techniques that may include receiving, on a host, a write operation that writes first data to a target location on a first logical device having storage provisioned on a first data storage system; determining, on the host and in accordance with one or more criteria, whether the first data is to be replicated on a second logical device on a second data storage system; and issuing the write operation from the host to the first data storage system, wherein the write operation denotes whether to disable replication of the first data to the second logical device on the second data storage system. Such techniques may include partitioning a single write operation into multiple write operations and setting an indicator in each of the multiple writes denoting whether remote replication of the write operation is enabled or disabled.

19 Claims, 12 Drawing Sheets

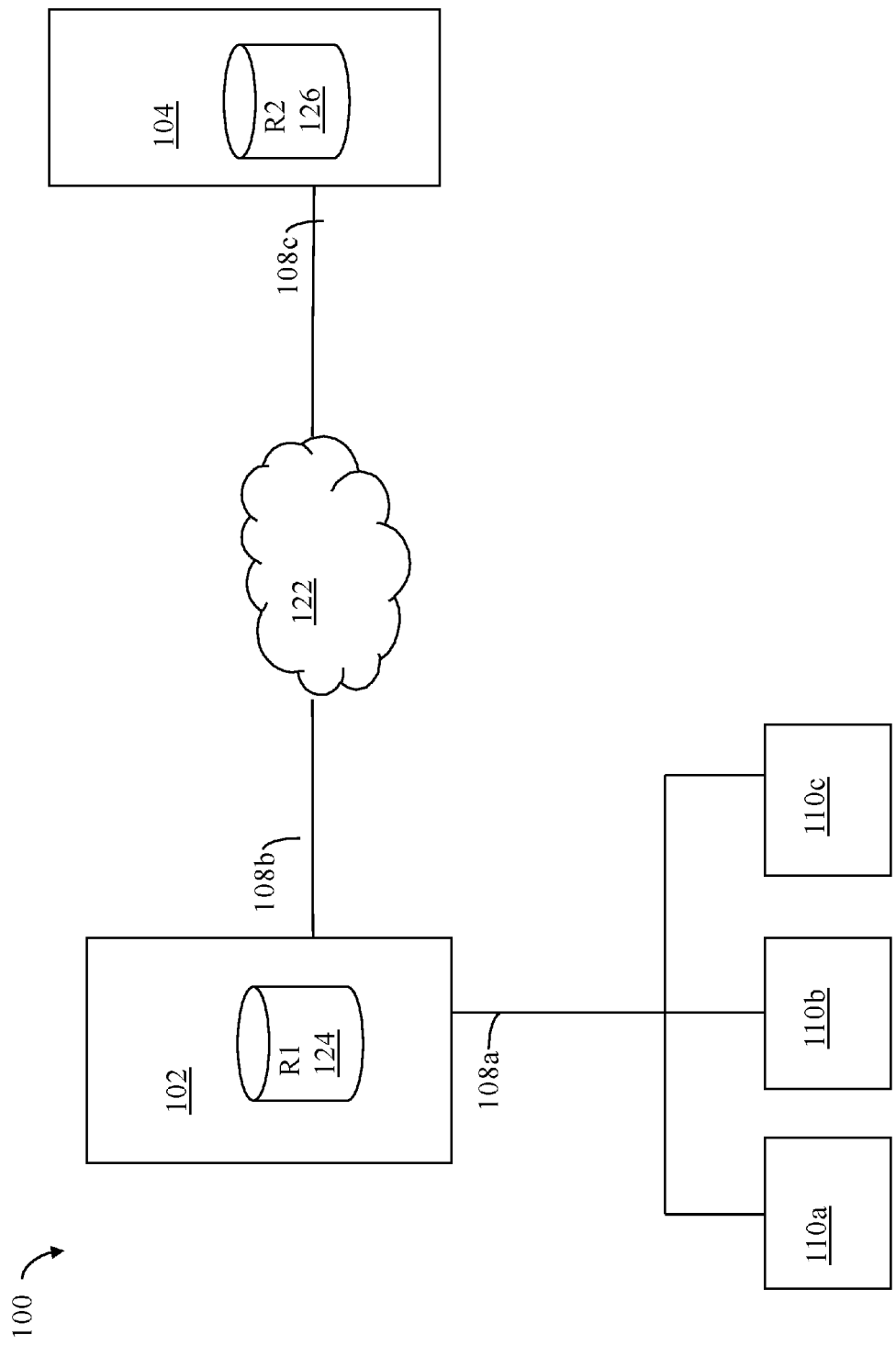

SELECTIVE DATA REPLICATION

BACKGROUND

Technical Field

This application generally relates to data storage and more particularly to techniques used in connection with data replication.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform I/O (input/output) operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like. Networked storage systems, such as data storage arrays, may be used to maintain data on different systems in different locations. Such mirroring may be used for a variety of reasons including reducing the likelihood of data loss. For example, in some implementations, a primary or source data site, such as a first or primary data storage system, may be configured in a partner relationship with a second or remote data storage system whereby the second data storage system includes a mirror or copy of data of one or more devices of the first data storage system.

SUMMARY OF THE INVENTION

In accordance with one aspect of techniques herein is a method of performing data replication comprising: receiving, on a host, a write operation that writes first data to a target location on a first logical device having storage provisioned on a first data storage system; determining, on the host and in accordance with one or more criteria, whether the first data is to be replicated on a second logical device on a second data storage system; and issuing the write operation from the host to the first data storage system, wherein the write operation denotes whether to disable replication of the first data to the second logical device on the second data storage system. An I/O driver on the host may perform the steps of determining and issuing. The first logical device on the first data storage system may configured to have data automatically replicated on the second logical device of the second data storage system. The method may include writing the first data to the target location on the first logical device on the first data storage system; and determining, on the first data storage system in accordance with an indicator of the write operation previously set by an I/O driver of the host, whether to replicate the first data to the second logical device on the second data storage system. The method may include responsive to determining to replicate the first data to the second logical device on the second data storage system, issuing another write operation from the first data storage system to the second data storage system, said another write operation writing the first data to the target location on the second logical device of the second data storage system. The I/O driver may perform first processing comprising: determining, in accordance with the one or more criteria on the host, whether all the first data of the write operation is to be replicated to the second logical device of the second data storage system; and responsive to determining, in accordance with the one or more criteria, that not all of the first data is to be replicated on the second logical device of the second data storage system, performing second processing by the I/O driver. The second processing may include partitioning the write operation into a plurality of write operations each writing some of the first write data to the first logical device; determining, in accordance with the one or more criteria, a set of one or more of the plurality of write operations each writing a portion of the first write data to the first logical device where the portion is not being replicated on the second logical device of the second data storage system; and inserting an indicator into each write operation of the set denoting that replication is disabled for data written by said each write operation of the set whereby data of said each write operation of the set is not replicated on the second logical device of the second data storage system. The method may include sending the plurality of write operations from the host to the first data storage system; and selectively replicating, on the second logical device on the second data storage system, data that is written by each of the plurality of write operations not included in the set. The I/O driver may have a mapping indicating which portions of the logical device are selectively replicated. The one or more criteria may include one or more predefined types of data for which data replication of the first logical device is selectively indicated as enabled or disabled. The predefined types of data may include any one or more of: user data, metadata, paging data sets, dump data sets, work files, and temporary files. The one or more criteria may indicate, for at least a first of the predefined types, to disable replication of data of the first logical device of the first data storage system to the second logical device of the second data storage system. The one or more criteria may indicate to selectively enable or disable data replication for a specified portion of at least one of the predefined types of data. The one or more criteria may indicate to selectively enable or disable data replication for any of: one or more user data files, one or more user file systems, one or more logical device portions, one or more specified extents or portions of a file, one or more particular data sets, one or more specified portions of metadata, data written by one or more specified applications, and data written by code executing on a particular operating system image on the host. The one or more criteria may include a schedule denoting a frequency of when data written to specified portions of the first logical device are selectively replicated from the first logical device of the first data storage system to the second logical device of the second data storage system. The schedule may indicate to replicate, at a single point in time, all data written to a particular portion of the first logical during a first time period. The method may include monitoring a frequency of modifications made to the particular portion of the first logical device; and modifying the schedule by adjusting, in accordance with said monitoring, a frequency of data replication of the particular portion of the first logical device. The one or more criteria may include at least a first criterion defining a significant data change for a particular portion of the first logical device. The method may include enabling replication of the particular portion of the first logical device responsive to detecting the significant data change for the particular portion of the first logical device, and otherwise disabling replication of the particular portion of the first logical device. The second data storage system may be one of a plurality of remote data storage systems and wherein the write operation may be selectively replicated on one or more of the plurality of remote data storage systems in accordance with the one or more criteria.

In accordance with another aspect of techniques herein is a computer readable medium comprising code stored therein, that, when executed, performs a method of data replication comprising: receiving, on a host, a write operation that writes first data to a target location on a first logical device having storage provisioned on a first data storage system; determining, on the host and in accordance with one or more criteria, whether the first data is to be replicated on a second logical device on a second data storage system; and issuing the write operation from the host to the first data storage system, wherein the write operation denotes whether to disable replication of the first data to the second logical device on the second data storage system. The write operation may be received from an application executing on the host.

In accordance with another aspect of techniques herein is a system comprising: a processor; and a memory comprising code stored therein that, when executed, performs a method of performing data replication comprising: receiving, on a host, a write operation that writes first data to a target location on a first logical device having storage provisioned on a first data storage system; determining, on the host and in accordance with one or more criteria, whether the first data is to be replicated on a second logical device on a second data storage system; and issuing the write operation from the host to the first data storage system, wherein the write operation denotes whether to disable replication of the first data to the second logical device on the second data storage system.

BRIEF DESCRIPTION OF THE DRAWINGS

Features and advantages of the present invention will become more apparent from the following detailed description of exemplary embodiments thereof taken in conjunction with the accompanying drawings in which:

FIGS. 1, 3, 4 and 8 are examples of embodiments of systems and components that may utilize the techniques described herein;

DETAILED DESCRIPTION OF
EMBODIMENT(S)

Figure 1:
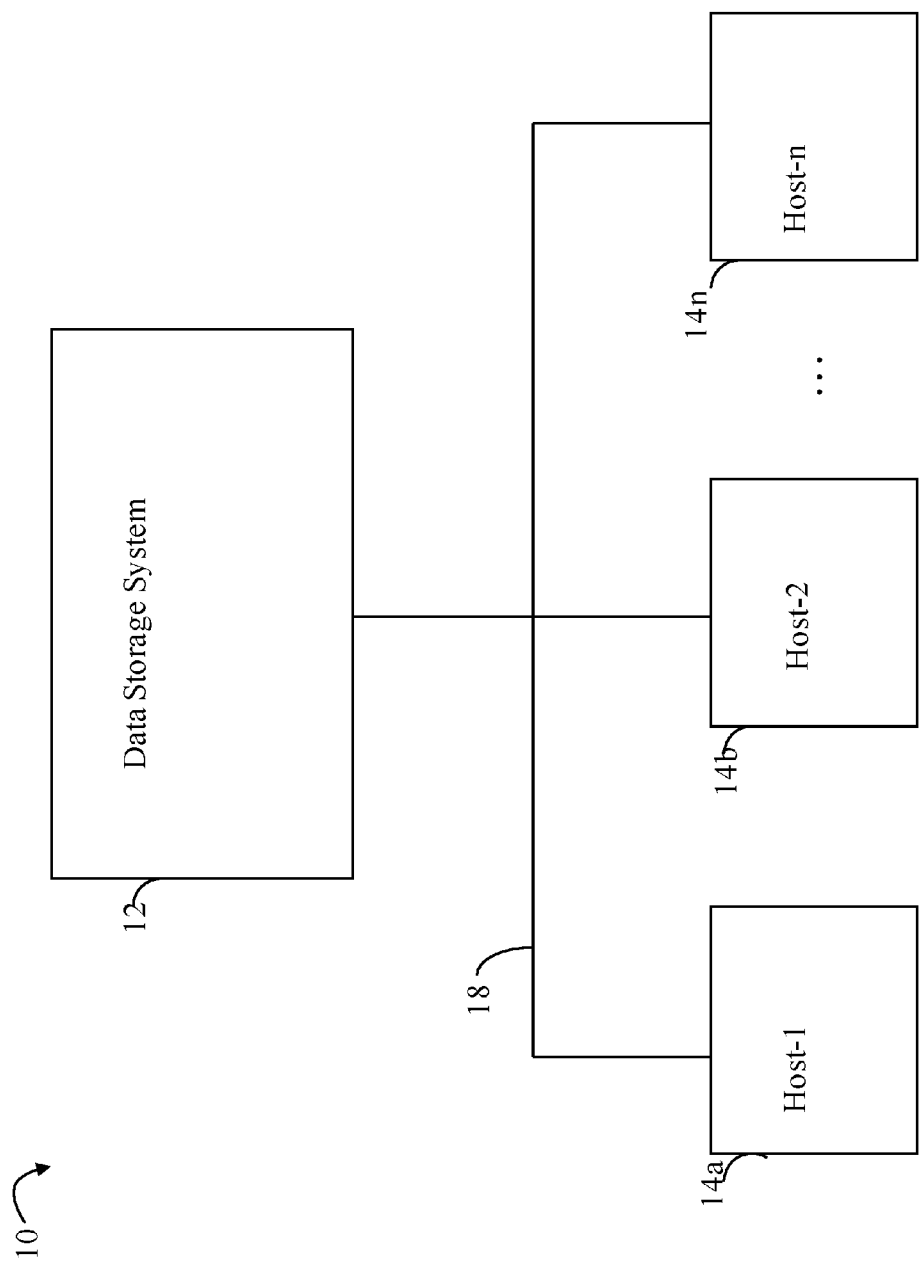

Referring to FIG. 1, shown is an example of an embodiment of a system and components that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
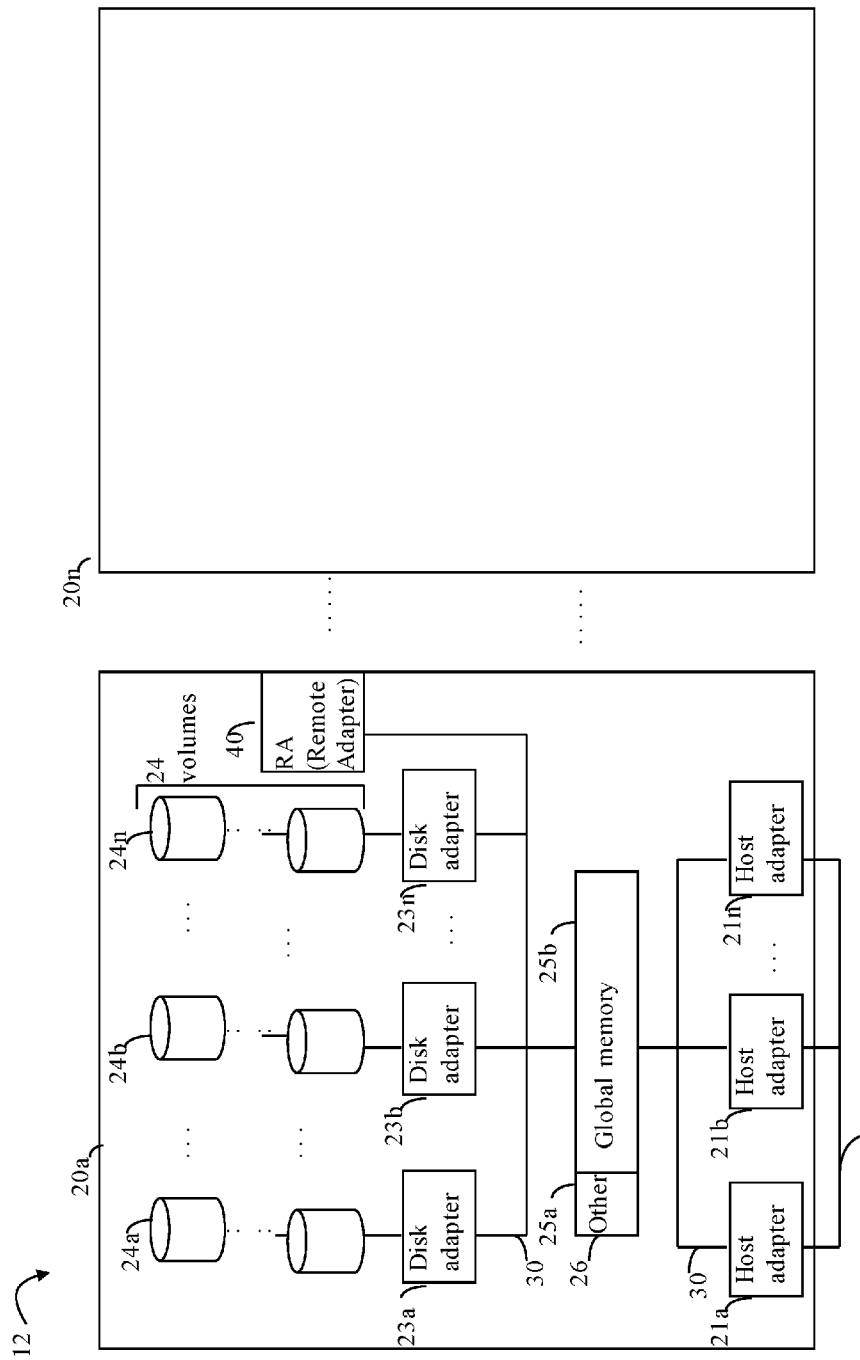
FIG. 2A is an example of an embodiment of a data storage system.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices, such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20a is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over Fibre Channel transmission channel supporting messaging traffic between data storage systems. The RA may be hardware including a processor used to facilitate communication between data storage systems, such as between two Symmetrix® data storage systems. The RA may be used with the Symmetrix Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable physical storage device such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. For example, one or more logical devices or volumes may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated physical storage devices or drive(s) and logical devices residing thereon.

Figure 2B:
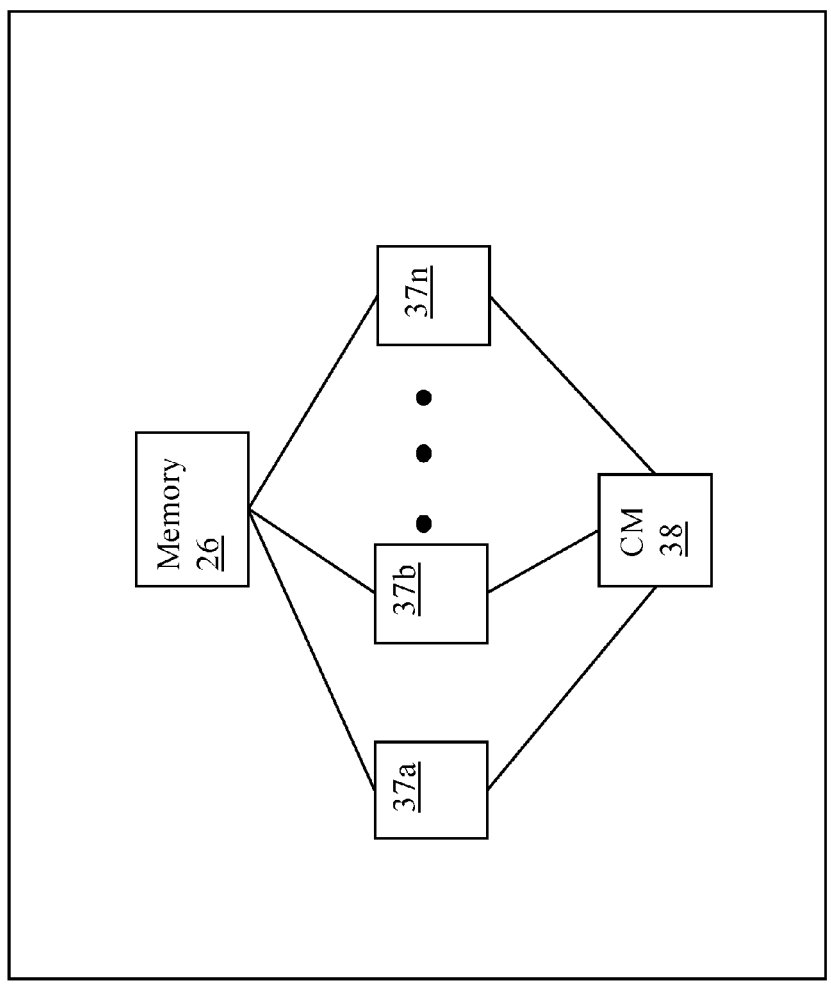
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Referring to FIG. 3, shown is an example of an embodiment of a system 100 that may be used in connection with the techniques described herein. It should be noted that the embodiment illustrated in FIG. 3 presents a simplified view of some of the components illustrated in FIGS. 1 and 2A, for example, including only some detail of the data storage systems 20a through 20n for the sake of illustration.

Included in the system 100 are data storage systems 102 and 104 and hosts 110a, 110b and 110c. The data storage systems 102, 104 may be remotely connected and communicate over network 122, such as the Internet or other private network, and facilitate communications with the components connected thereto. Hosts 110a, 110b and 110c may perform operations to data storage system 102 over connection 108a. The hosts 110a, 110b and 110c may be connected to the data storage system 102 through connection 108a which may be, for example, network or other type of communication connection. Although not illustrated, the hosts 110a-110c may also be directly connected to a network such as the Internet.

The data storage systems 102 and 104 may include one or more logical devices. In this example, data storage system 102 includes logical device R1 124 and data storage system 104 includes logical device R2 126. Both of the data storage systems may include one or more other logical and/or physical devices. Data storage system 102 may be characterized as local with respect to hosts 110a, 110b and 110c. Data storage system 104 may be characterized as remote with respect to hosts 110a, 110b and 110c. For example, in some embodiments in accordance with techniques herein, the distance between the data storage systems 102 and 104 may be 200 km or more.

In at least one embodiment, one or more of the hosts 110a-110c may access logical device R1 124 over connection 108a. Both the logical devices R1 124 and R2 126 may have a data layout based on the CKD (count key data) architecture and format, and one or more of the hosts 110a-c may access data of device R1 124 using a FICON connection. IBM's FICON (Fiber Connection) is a Fibre Channel protocol that provides high-speed connectivity between a channel and a control device and allows multiple data exchanges in full duplex mode. FICON may be used with Fibre Channel communication. FICON is compatible with z/Architecture computing systems in connection with I/O devices performing I/O processing therewith.

Elements 102 and 104 may each be a Symmetrix® data storage system, provided by EMC Corporation of Hopkinton, Mass., which is a data storage system compatible with FICON. For further discussion of FICON in connection with IBM System/390, a precursor to IBM System z, see DeCusatis, et al., "Fiber optic interconnects for the IBM S/390 Parallel Enterprise Server G5," IBM J. Res. Develop., Vol. 43, No. 5/6, September/November 1999, pp. 807-828, which is incorporated herein by reference.

CKD may be characterized as a data storage device architecture where each storage device record includes of a count field, an optional key field, and a ("user") data field with error correction/detection information appended to each field. The sizes of the records within a single device may vary with the CKD architecture. Since data record lengths can vary, they all have an associated count field which indicates the size of the key if used and the size of the data. The count field has the identification of the physical location in cylinder-head-record format, the length of the key, and the length of the data. The key may be omitted or consist of a string of characters. Most often the key is omitted, the record located sequentially or by direct cylinder-head-record addressing. If it is present, the key is typically a copy of the first n bytes of the data record but can be any data which will be used to find the record. The key (and hence the record) is locatable via hardware commands.

As known in the art and mentioned above, I/O requests directed to devices in accordance with the CKD format may be in the form of channel programs (also known as channel word programs or chains) including an ordered sequence of channel command words (CCWs); or transport mode (TCW) and the associated device command words (DCWs). Additionally, channel word programs, processing I/O requests, and the like, are described also, for example, in U.S. Pat. No. 6,954,835, INTERCEPTING CONTROL OF A HOST I/O PROCESS, issued Oct. 11, 2005 (the '835 patent); U.S. Pat. No. 6,986,009, INTERCEPTING CONTROL OF A HOST I/O PROCESS, issued Jan. 10, 2006 (the '009 patent); and U.S. Pat. No. 7,707,186, issued Apr. 27, 2010, METHOD AND APPARATUS FOR DATA SET MIGRATION (the '186 patent), all of which are incorporated by reference herein.

The host 110a may issue a command, such as to write data to logical device R1 of data storage system 102. In some instances, it may be desirable to copy data from the logical storage device R1 to another second logical storage device, such as R2, provided in a different location so that if a disaster occurs that renders R1 inoperable, the host (or another host) may resume operation using the data of R2. Such a capability is provided, for example, by the SRDF® products provided by EMC Corporation of Hopkinton, Mass. Communication between Symmetrix™ data storage systems using SRDF® is described, for example, in U.S. Pat. Nos. 5,742,792, 5,544,347, and 7,054,883, all of which are incorporated by reference herein. With SRDF®, a user may denote a first logical storage device, such as R1, as a master logical storage device and a second logical storage device, such as R2, as a slave logical storage device. Other incarnations of SRDF® may provide a peer to peer relationship between the local and remote storage devices. In this example, the host 110a interacts (e.g., issues I/O requests or commands) directly with the device R1 of data storage system 102, but any data changes made (e.g., such as due to writes to the logical device R1) are automatically provided to the R2 device of data storage system 104 using SRDF®. In operation, the host 110a may read and write data using the R1 volume in 102, and SRDF® may handle the automatic copying and updating of data from R1 to R2 in data storage system 104.

As illustrated in connection with other figures herein, data storage system 102 may have one or more RAs included therein to facilitate remote connections to the data storage system 104. Communications between storage system 102 and 104 may be made over connections 108b,108c to network 122. Data storage system 104 may include one or more RAs for use in receiving the communications from the data storage system 102. The data storage systems may communicate, for example, over Gigabit Ethernet connections supporting TCP/IP traffic. The SRDF® replication functionality may be facilitated with the RAs provided at each of the data storage systems 102 and 104. Performing remote data communications using SRDF® over a TCP/IP network is described in more detail in U.S. Pat. No. 6,968, 369, Nov. 22, 2005, Veprinsky, et al., REMOTE DATA FACILITY OVER AN IP NETWORK, which is incorporated by reference herein. In connection with SRDF®, a single RDF link or path may be between an RA of the system 102 and an RA of the system 104. Data written by one of the hosts 110a-c to the logical device R1 may be automatically transmitted, using RDF, over an RDF link 108b-108c, in connection with performing remote data replication over the RDF link between the systems 102 and 104.

An embodiment may also include the concept of a remote data facility (RDF) group in which one or more devices on a data storage system are associated with a particular group under the control of one or more RAs which services the devices included therein. Rather than have a single R1 device and a single R2 device, a grouping may be defined so that a source group of devices, such as on data storage system 102, have corresponding target devices of a target group, such as devices on data storage system 104. Devices in a source group may be mirrored in corresponding devices of a target group using SRDF® functionality.

Techniques herein may be used with SRDF®, or more generally any RDF, operating in one or more different supported modes. For example, such modes may include SRDF® operating in synchronous mode and asynchronous mode. For example, in connection with SRDF®, the host may issue a write to an R1 logical device in a first data storage system and the data change is propagated to the R2 logical device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system.

Depending on the physical distance between the data storage systems 102, 104, it may be desirable to operate in a mode such as asynchronous to avoid host timeouts while the host awaits acknowledgement regarding completion of a host I/O.

Described in following paragraphs are techniques that may be used in connection with performing data replication, such as in an asynchronous manner such as SRDF® operating in an asynchronous mode (SRDF®/A), or in a synchronous manner such as with SRDF® operating in a synchronous mode. With asynchronous mode remote data replication, a consistent point in time image is provided on the target R2 device that is only slightly behind (in terms of writes performed) the source R1 device. With asynchronous data replication such as with SRDF®/A, changes or writes to the first device or group of devices are collected for each occurrence of a time period, such as every X seconds, and then transferred to the R2 system to be applied to the second R2 device or group of devices. Although the remote R2 copy of the data will never be as current as the primary R1 copy, this method can replicate data over considerable distances and with reduced bandwidth requirements and minimal impact on host performance.

In connection with performing data replication in an embodiment such as described in connection with FIG. 3, the minimum replication unit may be a single logical device. The size of a logical device may be very large, for example, 1-2 terabytes (TBs) in size. In many cases, there may be no need to copy areas of the logical device, such as the R1 logical device 124, that are not needed or required on the remote data storage system 104. In connection with remote replication of a logical device, the data or information automatically replicated from system 102 to 104 may include user data as well as, for example, metadata, various work files or temporary files, and the like (e.g., generally both user data and non-user data). Examples of such information or areas of the logical device R1 124 that may be generally copied from system 102 to system 104 as part of remote data replication, but which may not be needed on the remote data storage system 104 may include, for example, a system-specific dataset, a temporary file, database work files, and sort work files. It may be the case, for example, that only the metadata describing these files may be required on the remote side. The data storage system 102 may have no knowledge about the host file structures, such as the metadata, residing on the logical device R1 124 and thus cannot make a determination regarding what particular portions of data relevant to R1 124 are to be selectively replicated from system 102 to 104, and what portions of data relevant to R1 124 are not to be replicated from system 102 to 104.

Described in following paragraphs are techniques that may be used in connection with performing selective remote replication. In at least one embodiment, a host-side application may indicate to the data storage system 102 what particular portions of the data and information regarding logical device R1 124 do not need to be replicated to the remote system 104. Additionally, different portions of data and information regarding the logical device R1 124 may also have different or varying replication requirements which the host-side application may also denote to the data storage system 102. For example, different data files (e.g., user data files, non-user data files such as work or temporary files used in performing various operations on the user data) and metadata relevant to the logical device R1 124 may have different replication requirements. Some data or information, such as various work or temporary files, may never need to be replicated. Some data or information, such as for various metadata structures, may only need to be sent one initial time and then subsequently only when and if such metadata is significantly modified. For other data or information, such as various user data files, the user may want to replicate modified user data from system 102 to 104 once a day rather than for each write or modification performed (e.g., for such data files, an embodiment may record which portions or tracks have been modified in the particular files and such modified portions or tracks may be pushed from system 102 to 104 on a daily or other specified basis). In at least one embodiment in accordance with the FICON/CKD architecture, techniques may be used to indicate per write I/O operation whether the written data of that single I/O operation does, or does not need to be replicated. In at least one embodiment, techniques may be performed by a host writing data to the logical device R1 124 where such techniques provide for selective replication of data of R1 124 from data storage system 102 to remote data storage system 104. In such an embodiment, data replication may be selectively performed such as by disabling data replication at various levels of granularity, such as disable data replication per write I/O level by system, subsystem, application, and file levels. An embodiment may even provide for selective replication by disabling data replication for portions of a file or at the sub-file level, such as per track or record or other unit of storage/granularity that may denote a portion of a file.

The foregoing and other aspects of techniques herein for selective replication are described in more detail in following paragraphs whereby generally, whether to enable or disable replication for one or more particular portions of a logical device may be performed in accordance with one or more criteria.

Figure 4:
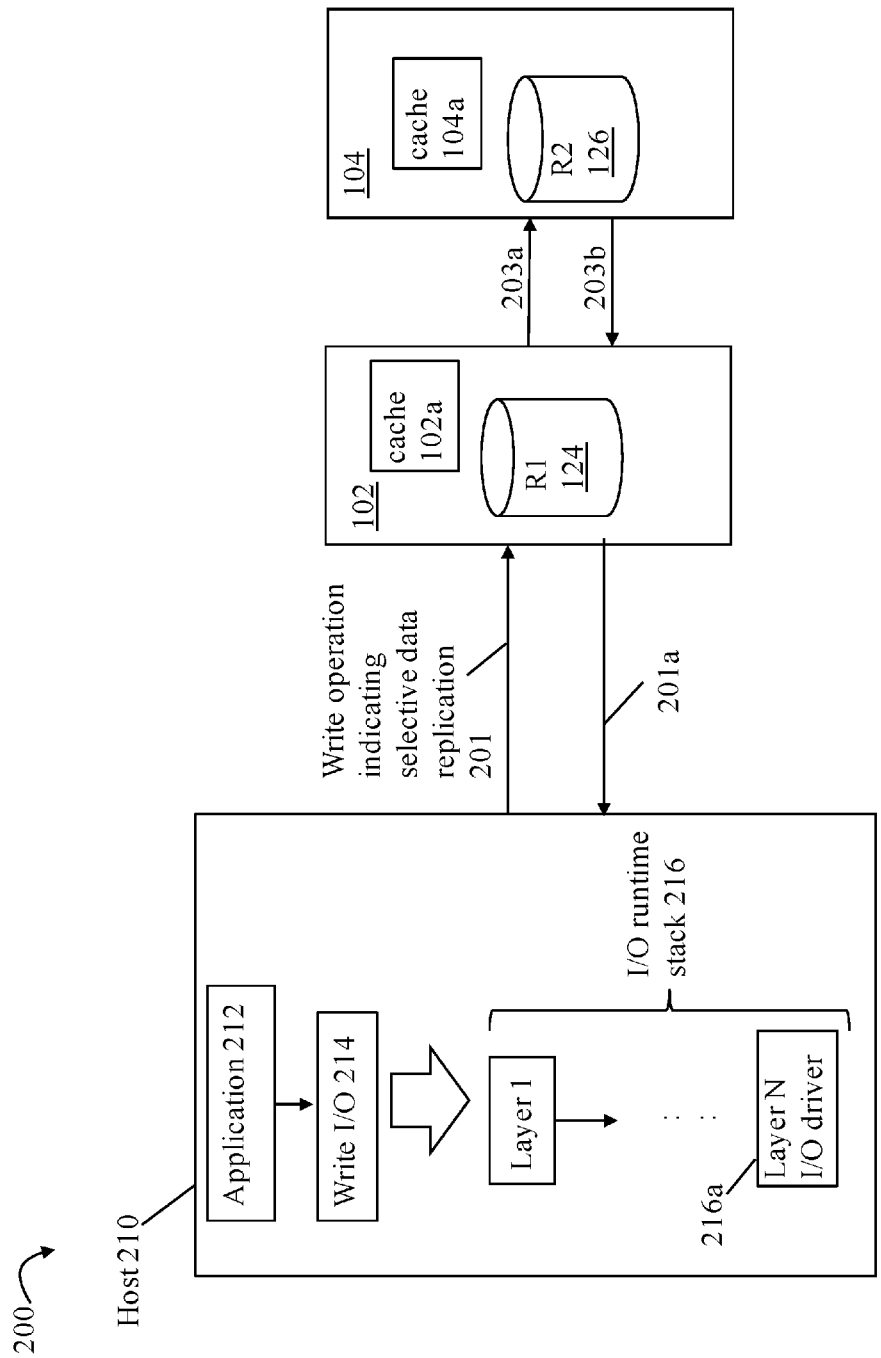

Referring to FIG. 4, shown is an example illustrating components and processing that may be performed in an embodiment in accordance with techniques herein. The example 200 includes host 210, the local or R1 data storage system 102, and the remote or second R2 data storage system 104. Elements 102 and 104 may be as described in connection with FIG. 3 whereby the R1 logical device 124 may be configured for remote replication as the R2 logical device 126 on the second data storage system 104. The host 210 may be a host similar to the hosts 110a-c and others as described herein. Additionally, the host 210 may include application 212 executing thereon which may issue a write I/O operation 214 that results in modification of data stored at a target location or offset on a logical device.

It should be noted that the write I/O operation 214 may generally denote a modification to any data stored on the logical device at the target location on a logical device. The write operation 214 may be a direct modification of user data, such as a write by the application 212 to update user data stored in a file. Additionally, and more generally, the write operation 214 may denote a modification to user data as well as other types of non-user data stored on the logical device besides user data. Such other types data of the logical device may also include, for example, metadata of the logical device, one or more predefined types of non-user data such as page files or data sets, work files or data sets, sort files or data sets, dump files or data sets, any type of temporary files that may be transiently used in connection with performing a requested operation, and the like, where such predefined types of non-user data may be generally stored on the logical device or for use in connection with the logical device. For example, page files, or page more generally page tables or paging data structures, may be stored on the logical device and used in connection with virtual memory management. A page table is the data structure used by a virtual memory system in a computer operating system to store the mapping between virtual memory addresses (e.g., logical addresses) and physical memory locations or addresses. A page denotes a portion of the data that may be stored at a particular physical memory location that is mapped into a particular portion of virtual memory. In other words, the page table is a structure on the host that maps a page having a virtual memory address to its physical memory address, assuming the page is currently located in memory and has not been paged out. The page table may be consulted in connection with determining the physical memory location for a particular page of data having an associated virtual address. If the page table indicates that the page is not located in physical memory (e.g., has been paged out of memory), the page of data may be paged into physical memory from its location on disk or other non-volatile storage media device. As different portions of data are paged in and out of memory, the page table structures may be accordingly updated. Thus, page tables may be stored on the logical device and modified as a result of different operations performed by the application.

Metadata of a logical device that may be modified may include structural information about a data layout of the logical device. For example, the metadata may indicate information such as particular offsets or locations on the logical device where a file system is stored, where each file is stored, where extents or portions of each file are stored, and the like. As a file may increase in size, for example, additional extents may be added to the file whereby such extents of the file may be located at noncontiguous logical offsets or logical addresses of the logical device. In a similar manner, as the file stored on the logical device decreases in size (e.g., such as portions of the file are deleted), the file's metadata stored on the logical device may also change to denote the removed extents. Thus, metadata may be stored at various logical addresses or locations of the logical device where such stored metadata is modified as a result of different operations performed by the application.

As another example of non-user data stored on a logical device that may be modified or written to the logical device, the application 212 may perform a sort operation. In connection with performing the sort operation, the application 212 may store temporary work or sort files on the logical device used internally in performing the sort function. Once the sort has been completed, the temporary sort files may be deleted or removed. While the sort operation is being performed, the sort files may be modified. Thus, temporary files, such as the foregoing sort files, are another example of non-user data that may be stored on the logical device and modified or written.

In this manner, the write operation 214 may denote generally a write operation that modifies data stored on the logical device whereby the write may modify user data and/or other types of non-user data such as the metadata, page files, temporary files, and the like, as noted above and elsewhere herein.

The write I/O 214 may result in execution of a sequence of runtime calls or invocations of the I/O path on the host as denoted by the I/O runtime stack 216. Generally, the I/O runtime stack 216 may be characterized as a sequence of layered calls performed to process the write operation 214. Layer 1 may denote the highest layer of the stack 216 and layer N may denote the bottom or lowest layer in the stack 216. As known in the art, the stack 216 may include, for example, a logical volume manager, one or more I/O drivers, and the like. For example, if the write 214 writes user data to a location in a user data file, the stack 216 may include one or more layers that map the particular file location of the user data file to a host side logical device and associated logical device location. Additionally, the stack 216 may include an I/O driver 216a which may be characterized as a low level I/O driver that, for example, forms I/O command blocks sent to the system 102 and also receives responses from the system 102 in accordance with the particular protocols supported in an embodiment.

In at least one embodiment in accordance with techniques herein, the I/O driver 216a may perform processing providing for selective replication of portions of the R1 logical device 124 from the local or first data storage system 102 to the remote or second R2 data storage system 104 where such selective replication is performed in accordance with one or more criteria. R1 124 and R2 126 may be logical devices configured for automatic remote data replication as described above with the difference that, per write I/O operation sent from host 210 to the local first data storage system 102, the single write operation may indicate whether the write data stored locally on the R2 device 124 also needs to be replicated remotely to the second data storage system 104. As described in more detail below, on a per write I/O basis, the I/O driver 216a may set, in accordance with one or more criteria, an indicator (also referred to herein as the replication indicator) in the write I/O denoting whether RDF (e.g., the remote replication facility) is to replicate the write I/O data from the R1 device 124 of the system 102 to the R2 device 126 of the remote system 104.

The write operation including the above-noted replication indicator, denoting whether to replicate the write operation data, may be directed to a target location of logical device R1 124. The write operation indicating the foregoing selective data replication may be sent 201 from the host 210 to the local or first data storage system 102. The local data storage system 102 may write the data of write operation to cache 102a of the local data storage system 102. Consistent with other discussion herein, the cached write data may be later destaged to physical non-volatile storage provisioned for the R1 logical device 124. Additionally, depending on the particular value of the replication indicator of the write operation, the local data storage system 102 may also issue another second write operation 203a to the remote data storage system 104 to replicate the write operation data to the R2 device 126. If the replication indicator indicates that the data of the write operation is not to be remotely replicated, the system 102 may return 201a an acknowledgement regarding completion of the write operation 201 once the write data is written to cache 102a and does not perform other processing to further replicate the write data on the R2 device 126 on the second remote data storage system 104.

If the replication indicator (of the received host write operation 201) indicates that the data of the write operation is to be remotely replicated, a second write operation 203a is issued from system 102 to system 104 whereby the second write operation data is stored in cache 104a of the system 104. Consistent with other discussion herein, the cached write data stored in cache 104a may be later destaged to physical non-volatile storage provisioned for the R2 logical device 126. Once the second write operation data 203a has been written to cache 104a, an acknowledgement 203b regarding completion of the second replication write may be returned by the system 104 to the system 102.

In at least one embodiment where synchronous remote data replication from R1 124 to R2 126 is performed, system 102 may return an acknowledgement 201a to the host regarding completion of the host write operation 201 only after system 102 receives the acknowledgement 203b from system 104 regarding completion of the second replication write. In at least one embodiment where asynchronous remote data replication from R1 124 to R2 126 is performed, system 102 may return an acknowledgement 201a to the host regarding completion of the host write operation 201 once the write operation data is written to the local system cache 102a (e.g., does not require that the system 102 receives the acknowledgement 203b from system 104 regarding completion of the second replication write before returning acknowledgement 201a to the host regarding completion of the write operation).

Figure 5:
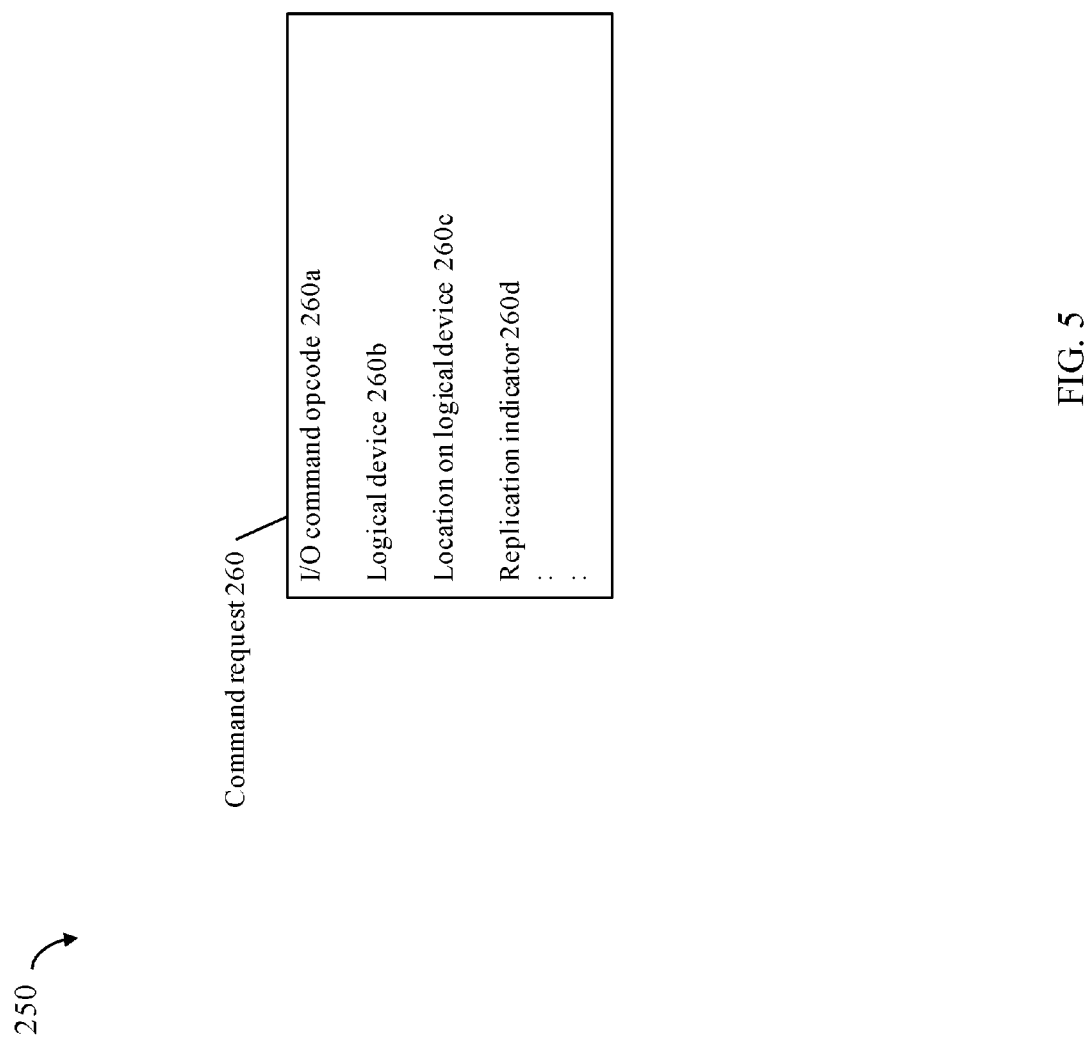
FIG. 5 is an example illustrating a command request that may be used in an embodiment in accordance with techniques herein.

Referring to FIG. 5, shown is an example 250 illustrating information that maybe included in a command request in an embodiment in accordance with techniques herein. The command request 260 may be a request to perform an I/O operation such as may be sent 201 from the host 210 of FIG. 4 to the local first data storage system 102. The command request 260 may include information such as the I/O command opcode 260a indicating this is a write operation, the particular logical address (e.g., the logical device 260b and location or logical offset(s) 260c on the logical device) to which this write I/O is directed, replication indicator 260d indicating whether to replicate this particular write operation data to the R2 logical device of the second remote data storage system, and the like. The different pieces of information in 260 may be included in various fields of the command request as may vary with the particular layout of the structure for 260 used in an embodiment. For example, in at least one embodiment, the replication indicator 260d may be included in a header or control portion of the command request and may be specified as a bit value with a value=1 indicating to perform remote replication for the write operation, and a value of 0 indicating not to perform remote replication with respect to the write operation. In at least one embodiment, the default value for the replication indicator 260d may be to replicate (e.g., value=1).

In at least one embodiment, the replication indicator 260d may be set (e.g., =1) by the I/O driver 216a of the host 210 to indicate that the data written to the particular logical address is to be written to the R1 logical device 124 on the local or first data storage system 102 and additionally is also to be replicated to the R2 logical device 126 on the remote or second data storage system 104. A replication indicator 260d may not be set (e.g., disabled such as by specified a value of zero) by the I/O driver 216a to indicate that the data written to the particular logical address is to be written to the R1 logical device 124 on the local or first data storage system 102 and is not to be additionally replicated to the R2 logical device 126 on the remote or second data storage system 104.

Figure 6:
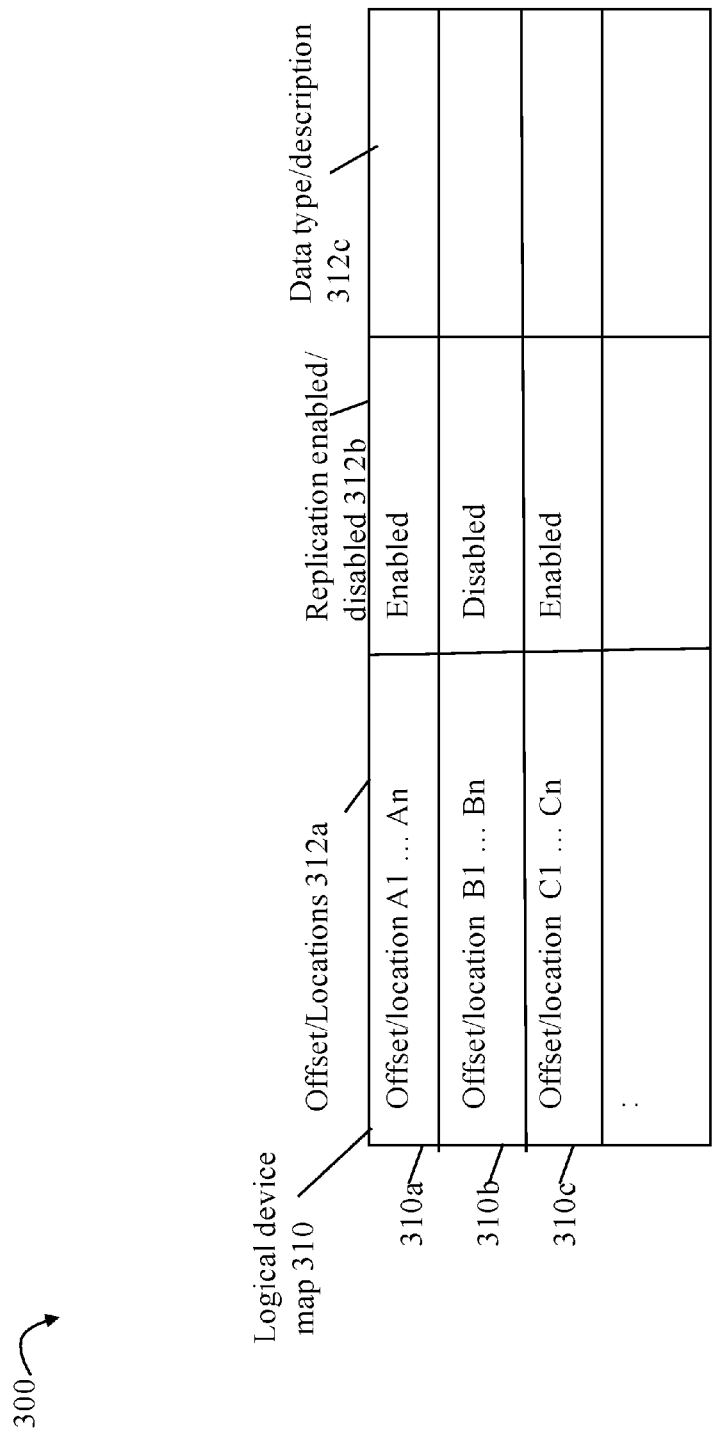
FIG. 6 is an example of a logical device map that may be used in an embodiment in accordance with techniques herein.

Referring to FIG. 6, shown is an example 300 of mapping information that may be used by the host I/O driver in an embodiment in accordance with techniques herein. The example 300 illustrates a logical device map 310 that indicates for different offsets or locations 312a of the logical device whether replication is enabled or disabled 312b for each specified sequence of offsets or locations. Additionally, an embodiment may denote in the map 310 the type of data 312c stored at particular logical device locations or offsets. A different logical device map 310 may be maintained on the host for each logical device stored on the local or R1 data storage system 102 configured for remote replication to the second R2 or remote data storage system 104. Each row of 310 denotes a sequence of one or more contiguous logical device offsets or locations (in column 312a) and indicates (in column 312b) for the sequence whether replication is currently enabled or disabled and also may denote the type of data (in column 312c) stored at the particular offset or location(s) of the same row. For example, row 310a indicates that, for offset or locations A1 through An of the R1 logical device 124, replication to R2 126 of the data storage system 104 is enabled; row 310b indicates that, for offset or locations B1 through Bn of the R1 logical device 124, replication to R2 126 of the data storage system 104 is disabled; and row 310c indicates that, for offset or locations C1 through Cn of the R1 logical device 124, replication to R2 126 of the data storage system 104 is enabled. Additionally, rows 310a-c may denote in column 312c a particular type of data or description of the data stored there (e.g., user data, non-user data, one of the predefined non-user data types or categories such as metadata, work files, temporary files, page files, sort files, and the like as described herein, a user-defined data type).

In at least one embodiment, columns 312a-b of the logical device map 310 may be implemented as a bitmap with a different bit for each particular offset or location (e.g., each of which denotes a different specified unit or amount of storage) whereby the bit has a value of 1 indicating replication is enabled for the particular offset or location, and otherwise has a value of 0 indicating that replication is disabled for the particular offset or location.

Different offsets or locations of the logical device map 310 may correspond to different types of user data and non-user data, such as various predefined types of non-user data described above and elsewhere herein. For example, logical device metadata may be located at a first set of offsets or locations on a logical device as denoted by the map 310. Additionally, various work files, temporary files, and other predefined types of non-user data, may be located at a second different set of locations and offsets denoted by the map 310. Different portions of the user data, such as various files, portions of extents of files, file systems, and the like, may be located at a third different set of locations and offsets denoted by the map 310. In at least one embodiment, different predefined types of non-user data may be, by default indicated as either having data replication enabled or disabled. For example, in at least one embodiment, all temporary files such as work files, page tables, dump files, sort files, and the like, may have replication selectively disabled by default. Dump files, as also mentioned elsewhere herein, may be characterized as a file containing a dump of data often associated with a particular state of a system, program, application, and the like. A dump file may, for example, include information regarding the runtime state in connection with a particular error or problem that occurred. The dump file may be useful for further analysis in determining the source of an error such as in connection with runtime debugging of an application.

Metadata portions of the logical device may be selectively enabled for replication where such selective replication may further be performed in accordance with a schedule rather than for each write or modification to the metadata portions. The schedule may indicate, for example, to initially replicate all metadata portions from system 102 to system 104. Thereafter, different portions of the metadata may be selectively replicated based on a defined time period basis such as each week, each day, and the like. As a variation, an embodiment may track or monitor the changes to the metadata portions, may collect all writes or modifications to the metadata portions, and then replicate all the metadata modifications made during the time period from the system 102 to 104 (e.g., the I/O driver on the host may collect the writes or modifications and then issue a write operation to the R1 device 124 of system 102 where the write operation denotes the combined collective writes or modifications and the write operation indicates to replicate the data from system 102 to system 104). The foregoing may be performed for different amounts of time determined in accordance with the frequency of the metadata modifications (e.g., based on a specified threshold number of metadata modifications or threshold amount of data modified where such modifications/writes may be collected on the host. When the threshold amount is reached, that triggers replicating a write operation to the R1 device of the local system 102 of all such metadata modifications which are then replicated to the system 104).

As a further variation, an embodiment may define what is considered a significant modification to a data portion of the logical device, such as define what is considered a significant modification to the metadata, or portions thereof. Responsive to the I/O driver detecting a significant modification by a write operation to the metadata, the I/O driver may indicate the write operation data is to be replicated from the system 102 to the system 104, and otherwise, no such replication is performed for modifications that are not determined as signification metadata changes. To further illustrate, an embodiment may define as a significant metadata modification a modification to extent information of a file. If a new extent is added to a file, an extent is deleted from a file, or an extent for a file is relocated, the metadata for the file is updated where any such file metadata update is considered a significant metadata modification. The metadata regarding files may be stored at particular locations of the logical device as denoted by the map 310 whereby when a write or modification to the file metadata (stored as such particular locations of the map 310) is detected, the I/O driver may selectively indicate to replicate the write or data modification of the file metadata from the system 102 to the system 104. As described above, the I/O driver may indicate to perform this selective replication of the write I/O data by setting the replication indicator in the write command issued from the host 210 to the local data storage system 102. An embodiment may define one or more criteria defining what is a significant modification to metadata, or more generally any data portion of a logical device. An embodiment may perform selective replication of a modified data portion based on a determination that the modification is significant in combination with a schedule or other criteria affecting the frequency with which the collected one or more writes are sent from system 102 to system 104. For example, an embodiment may collect significant writes or modifications for a specified time period and then collectively send such writes or modifications from system 102 to 104 at the end of the time period. The amount of time represented by the time period may vary with a level of importance in keeping the remote R2 copy 126 up to date. The amount of time may be specified as part of the criteria as described above. As a variation, an embodiment may specify a threshold number of one or more significant changes whereby once such threshold has been reached, the collected significant changes are sent as write operations to system 102 which are further replicated to system 104. In this latter case, the amount of time that has lapsed varies with the amount of time it takes to reach the specified threshold. The threshold may be specified in any suitable manner, such as a number of write operations and/or an amount of write data/amount of data modified.

An embodiment may also provide a customer or user with the ability/capability to selectively indicate whether replication is enabled or disabled for particular portions of a logical device. For example, an embodiment may expose to the customer or user through an interface some or all of the different predefined types of non-user data whereby the customer may select to enable or disable replication for different predefined types of non-user data (e.g., all temporary files, all work files, all page file, all sort files), and enable or disable replication for particular instances of a particular predefined type of non-user data (e.g., work files user by a particular application). Modifications to non-user data may be enabled or disabled on the basis of any of: the application performing the modification; operating system of the application performing the modification; particular file, portion or file extent, or file system having its non-user data modified; and particular application subsystem or system performing the non-user data modification. In at least one embodiment, the interface may also provide the customer with the option to selectively enable or disable replication for different portions of user data (e.g., writes of user data to a particular file, portion(s) or extent(s) of a file, particular file system, user data written by a particular application, subsystem, or system). Additionally, an embodiment may also provide the user with the option to further specify user-defined data categories or types for which the user may then select to enable or disable replication.

It should be noted that generally, whether to enable or disable replication for one or more particular portions of a logical device may be performed in accordance with one or more criteria as noted above and elsewhere herein. The one or more criteria may be specified for different portions of the logical device and include, for example, whether a particular portion of the logical device is of a particular predefined type of non-user data (e.g. metadata, temporary files, work files, page files, sort files), whether a particular portion of the logical device is a specified instance of a particular predefined type of non-user data, whether the particular non-user or user data written by the write operation is issued from a particular application (e.g., particular type of application or instance of an application), whether the particular data (user or non-user data) written by the write operation is directed to a particular file, portion or extent of a file, particular file system, and one or more conditions defining what is a significant data modification warranting replication of the modified or written data from the local system 102 to the remote system 104. Thus generally different conditions, factors, considerations, and the like, as described herein affecting whether to selectively enable or disable replication for portions of a logical device may be referred to as the one or more criteria used in connection with determining whether to replicate different portions of a logical device. In at least one embodiment as described herein, the host I/O driver 216a may use such one or more criteria in connection with determining whether to selectively replicate a modification or write of different portions of each logical device.

In this manner, the user may indicate to selectively enable or disable replication for particular portions of each logical device whereby the user may indicate her/his selections (of the one or more criteria used in determining whether and when to replicate write data from system 102 to system 104). The user may, for example select one or more predefined categories, select one or more logical entities (e.g., application(s), file(s), portions or extents of a file, file system(s), system(s), subsystem(s)), and/or select particular data sets of a particular predefined category or user defined category, and the host may further map the user selections to corresponding portions of one or more logical devices for which replication is to be selectively enabled or disabled. When writes or modifications to different portions of the logical devices are performed, the I/O driver may then use such user specified selections affecting replication, in combination with any default or system specified selections affecting replication, as the one or more criteria used in determining whether each write to a logical device on system 102 should also be replicated to the system 104. For example, a user may select to disable replication for one or more user data files stored on the logical device R1 124 on system 102. The user may identify the one or more user data files by specifying the file name of each such data file. The host may further perform processing to map each specified user file name to its corresponding offsets or locations on the logical device and indicate such offsets or locations storing user data as having replication disabled. Thus, a write of user data to a first specified user data file stored on the R1 device 124 is not replicated from system 102 to system 104. However, it should be noted that changes to first metadata for the foregoing first specified user data file stored on the R2 device 124 may be replicated independent of whether the user data of the file itself is replicated. For example, a user may perform writes of additional user data to the first user data file so the file increases in size requiring additional extents of storage for the file. The added user data for the writes is not replicated from system 102 to 104. However, the file's metadata is also modified due to the added extent information added to the metadata, and such metadata modifications may be determined as significant changes causing writes that modify the file's metadata to be replicated from system 102 to system 104 even though the file's user data may not be so replicated.

The one or more criteria may indicate to perform selective replication of portions of a logical device based on a level of security or sensitivity associated with the stored data (e.g., user data and/or non-user data. For example, particular data files may include personal information of different people such as medical information, financial information, passwords, social security number, credit card numbers, and the like. Such personal information may be considered sensitive or require a heightened level of security in connection with storing or replicating such personal information. As such, a customer may define a customer-based policy indicating what files or data portions include such sensitive or secure data that should not be replicated, should only be replicated under certain conditions identified in the one or more criteria (used to determine selective data replication), and the like. Such customer policies may be used in the one or more criteria used in selective replication of different portions of a logical device R1 124 from system 102 to system 104.

The I/O driver may receive a write operation from the host application where the write operation is directed to the logical device R1 on system 102 and use information in the logical device's map 310, or more generally in accordance with the one or more criteria, to determine whether to indicate in the write operation to the data storage system 102 that replication to the remote data storage system 104 is accordingly enabled or disabled.

In at least one embodiment, replication may be enabled or disabled via an indicator in the write operation affecting the entire write operation as described above. However, it may be desirable to provide a finer granularity of selective replication. For example, the host application may issue a write operation to a target location on the logical device where the target location denotes a logical address portion including a first logical address portion for which replication is enabled in accordance with the one or more criteria, and a second logical address portion for which replication is disabled in accordance with the one or more criteria. More generally, the target location of a write operation may denote a logical address range that includes one or more logical address range portions for which replication is enabled in accordance with the one or more criteria, and one or more other logical address range portions for which replication is disabled in accordance with the one or more criteria. In such instances, the I/O driver may receive the single host write operation and further partition the single host write operation into multiple write operations where each of the multiple write operations may write data to a different logical address portion, and each of the multiple write operations may individually have an indicator denoting whether to selectively perform replication to the remote second data storage system 104 for a single one of the multiple write operations created from the single host write operation. For example with reference to FIG. 6, a single host write operation may write data to a target logical address range on the logical device where the target logical address range spans 310a and 310b. Assume the single host write operation writes data to the target logical address range A1-Bn. In this case, the I/O driver may look up in the map 310 and determine that the single host write spans a target that includes locations that are both enabled and disabled for replication. The I/O driver may partition the single host I/O write into two smaller write operations including a first write operation that writes data to locations A1 through An and a second write operation that write data to locations B1 through Bn. The first write operation may indicate that replication is enabled (e.g., replication indicator=1), and the second write operation may indicate that replication is disabled (e.g., replication indicator=0). The I/O driver may perform the foregoing partitioning in a manner transparent to the issuing application and issue the multiple smaller write operations to the data storage system 102 rather than a single write operation. In such an embodiment, the I/O driver may perform additional processing to track the status of each of the smaller write operations since each such write operation may be completed and performed in any order. More generally, the I/O driver may partition a single originating host write operation into any suitable number of smaller write operations (e.g., writing to a different logical address range) whereby collectively the smaller write operations specify a collective or aggregate set of target logical addresses equivalent to that of the single originating host write operation.

Figure 7:
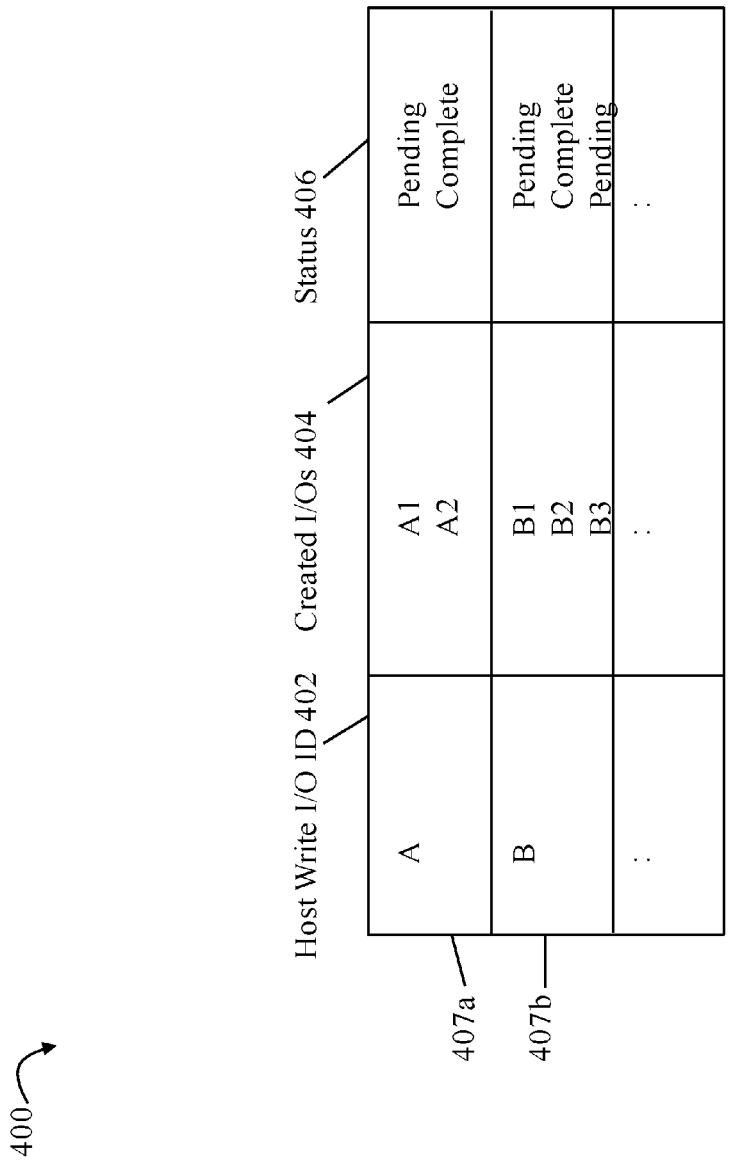
FIG. 7 is an example of information that may be used by an I/O driver in connection with partitioning a single write operation into multiple write operations in an embodiment in accordance with techniques herein.

Referring to FIG. 7, shown is an example of information that may be used by an I/O driver of the host in an embodiment in accordance with techniques herein. The example 400 illustrates information that may be maintained and used by the I/O driver in connection with tracking the multiple write operations created as a result of a single originating host write operation such as issued by an application executing on the host. In at least one embodiment, each originating host write I/O that is further partitioned into multiple smaller writes may be assigned a unique identifier (ID) used to track and uniquely identifier the originating host write I/O. The table 400 may include a first column 402 denoting the originating host write I/O ID, a second column 404 denoting the multiple smaller write I/Os created from the single host write I/O, and a third column 406 denoting the status of each of the smaller write I/Os. The table may include a set of information or entry for each of the originating write I/Os. For example, row 407a includes information for the single host write I/O having ID=A for which the I/O driver created two smaller I/Os—A1 and A2. In this example as denoted by 407a in column 406, write A1 is still pending while write A2 has completed. Row 407b includes information for another single host write I/O having ID=B for which the I/O driver created 3 smaller I/Os—B1, B2 and B3. In this example as denoted by 407a in column 406, writes B1 and B2 are pending while write B2 has completed.

A status of pending in column 406 may denote that particular smaller write operation has not yet completed in that the I/O driver on the host has not yet received an acknowledgement from the local or first data storage system 102 that the smaller write operation has completed. A status of completed in column 406 may denote that particular smaller write operation has completed in that the I/O driver on the host has received an acknowledgement from the local or first data storage system 102 that the smaller write operation has completed. Once the I/O driver receives notice of completion of all smaller writes 404 created for a particular originating write denoted by 402, then the I/O driver may return an acknowledgement to the application or other requester that the originating write has completed. The I/O driver may also update the table 400 to remove information regarding an originating write once all created writes for the originating write have completed.

Figure 8:
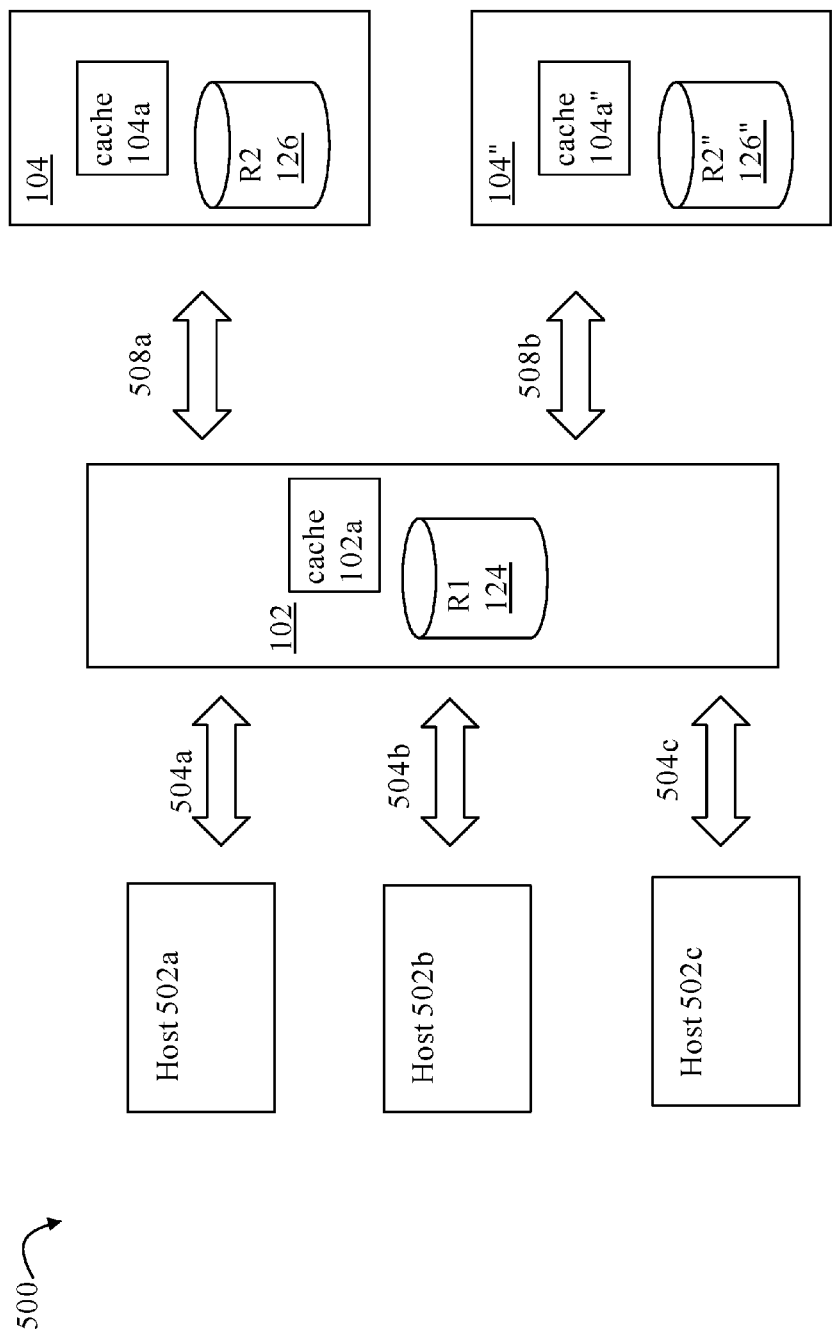

Referring to FIG. 8, shown is another example of components that may be used in an embodiment in accordance with techniques herein. The example 500 includes multiple hosts 502a-c where each of the hosts 502a-c may include components and perform processing such as described elsewhere herein (e.g., another instance of a host similar to host 210). Element 102 may denote a local or first data storage system 102 having a local or R1 logical device 124 configured to be remotely replicated on the remote or second data storage system 104. Elements 102 and 104 of FIG. 8 are as described above in connection with other figures. Additionally, illustrated is element 104" which may denote another second instance of a remote data storage system 104". The data storage system 104" may be similar to the first remote data storage system 104. In this example 500, the local R1 logical device 124 may be configured to be replicated remotely on multiple remote data storage systems 104 and also 104". For simplicity of illustration, only 2 remote systems 104, 104" are illustrated but more generally, there may be any suitable number of remote systems similar configured to remote replication of logical device R1 124 of system 102.

Each of the hosts 502a-c may have a customized local version of a logical device map 310 such as described in connection with FIG. 6 and make independent decisions regarding selective replication of writes to different portions of the logical device R1 124. Host 502a may issue writes to R1 124 that are sent 504a to the system 102 in a manner similar to that as described above regarding the host 210 whereby each such write may include an indication as to whether to remotely replicate the write to any one or more of the remote systems 104, 104". Host 502b may issue writes to R1 124 that are sent 504b to the system 102 in a manner similar to that as described above regarding the host 210 whereby each such write may include an indication as to whether to remotely replicate the write to any one or more of the remote systems 104, 104". Host 502c may issue writes to R1 124 that are sent 504c to the system 102 in a manner similar to that as described above regarding the host 210 whereby each such write may include an indication as to whether to remotely replicate the write to any one or more of the remote systems 104, 104".

Thus, in accordance with techniques herein, writes or modifications to different portions of R1 124 made by any of the hosts 502*a-c* may be selectively replicated to any one or more of the data storage systems 104 and/or 104". For example, a write by any of the hosts 502*a-c* to R1 124 may be replicated to neither 104 nor 104". As a second option, a write by any of the hosts 502*a-c* to R1 124 may be replicated 508*a* to 104 but not replicated 104". As a third option, a write by any of the hosts 502*a-c* to R1 124 may be replicated 508*b* 104" but not 104. As a fourth option, a write by any of the hosts 502*a-c* to R1 124 may be replicated 508*b* to 104" and also replicated 508*a* to 104. In such an embodiment, selectively replicating writes to particular one or more of the multiple remote data storage systems 104, 104" may be indicated and performed in any suitable manner. For example, additional information may be indicated by each write operation issued from one of the hosts 502*a-c* to the local data storage system 102 where such additional information may identify to which one or more remote data storage systems 104, 104" the write operation is replicated. As a variation, the local data storage system 102 may perform processing to track and determine which of the one or more remote data storage systems 104, 104" each write operation is replicated to.

In the example 500, each of the hosts 502*a-c* may include their own local instance of a logical device map 310 for the same R1 logical device 124 as described above. Each of the hosts 502*a-c* may perform independent determinations in accordance with its own local set of specified criteria affecting whether or not to replicate each write operation directed to R1 124 to one of more of the remote systems 104, 104".

Figure 9:
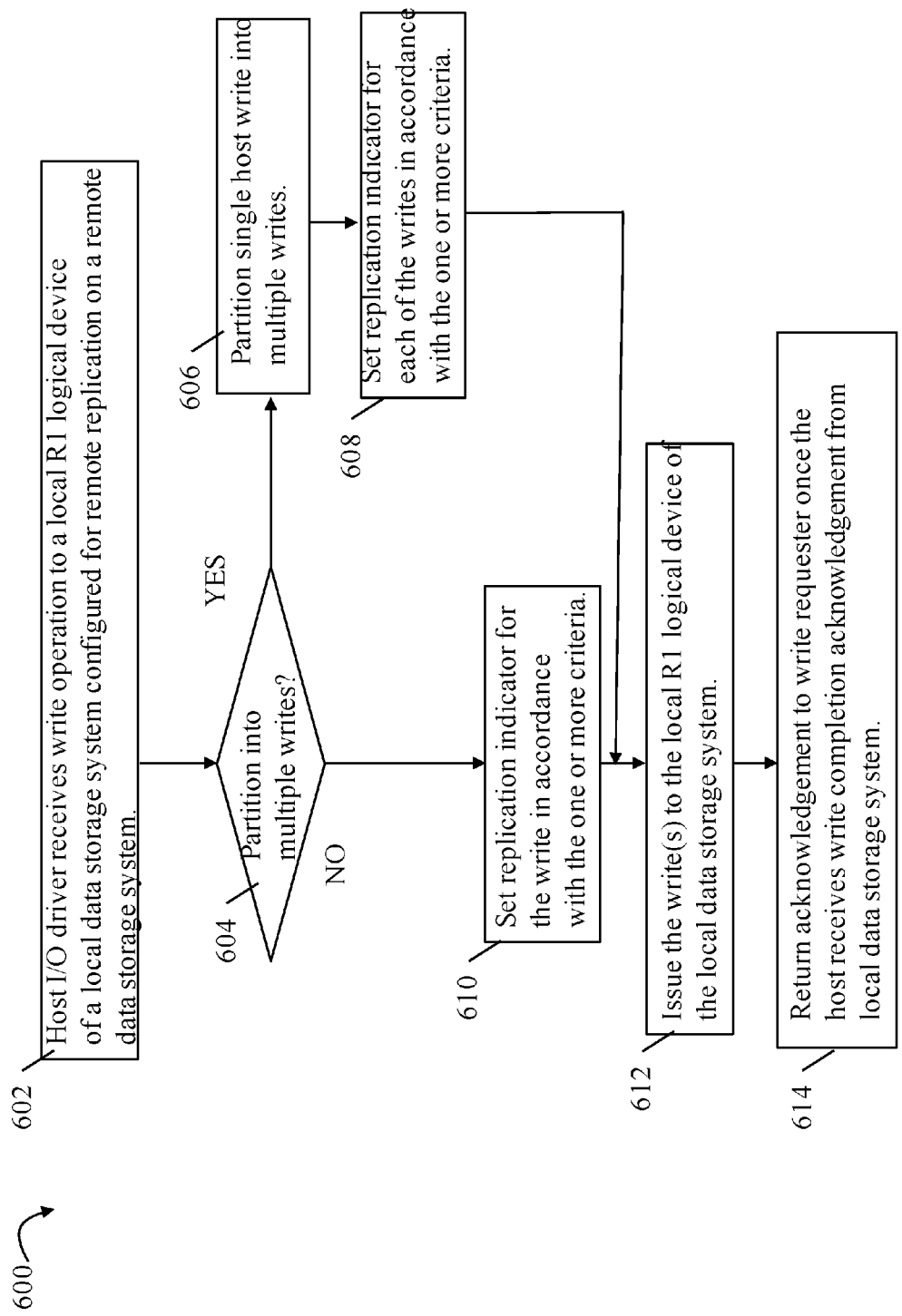
FIGS. 9, 10 and 11 are flowcharts of processing steps that may be performed in an embodiment in accordance with techniques herein.
Figure 10:
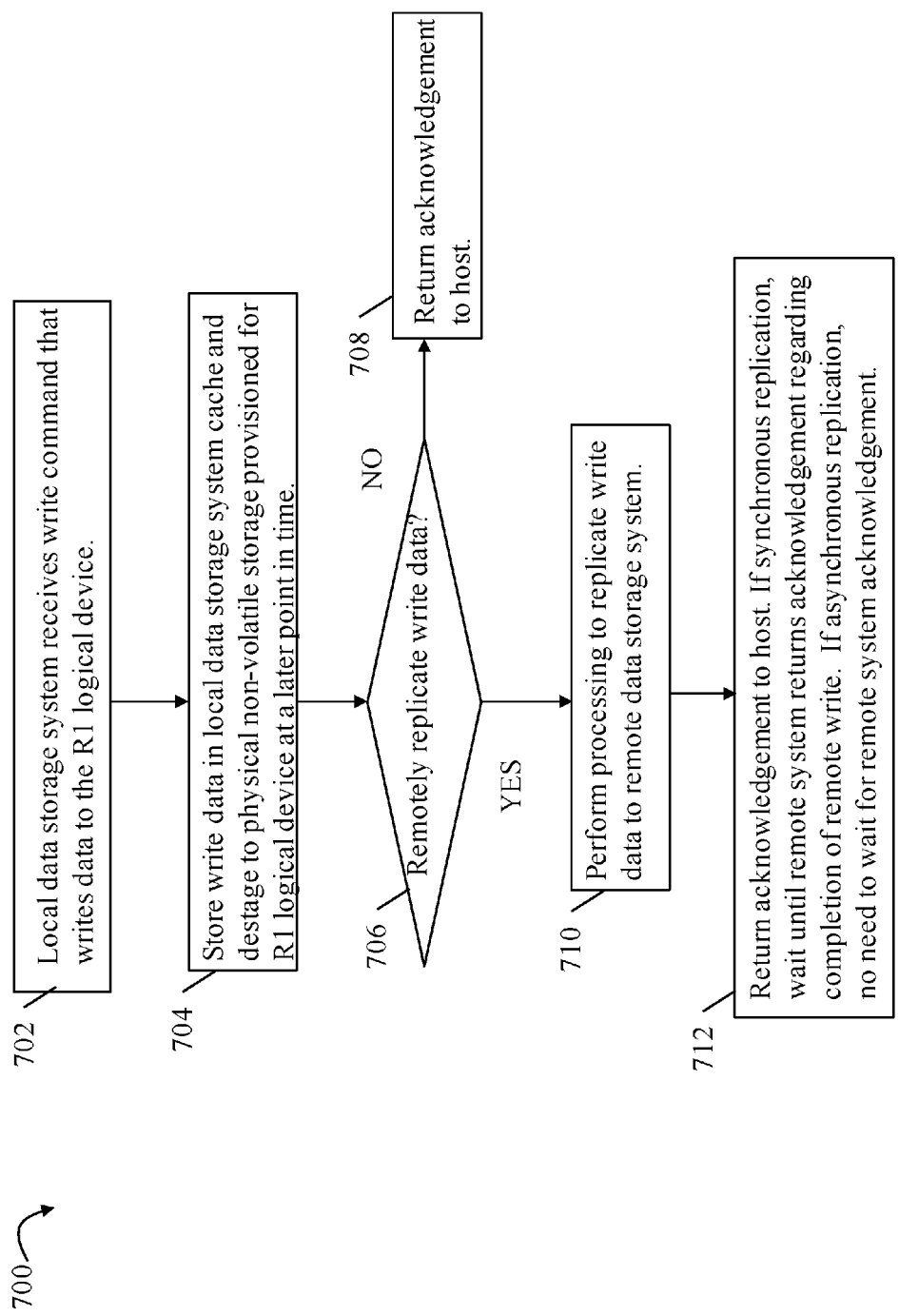
Figure 11:
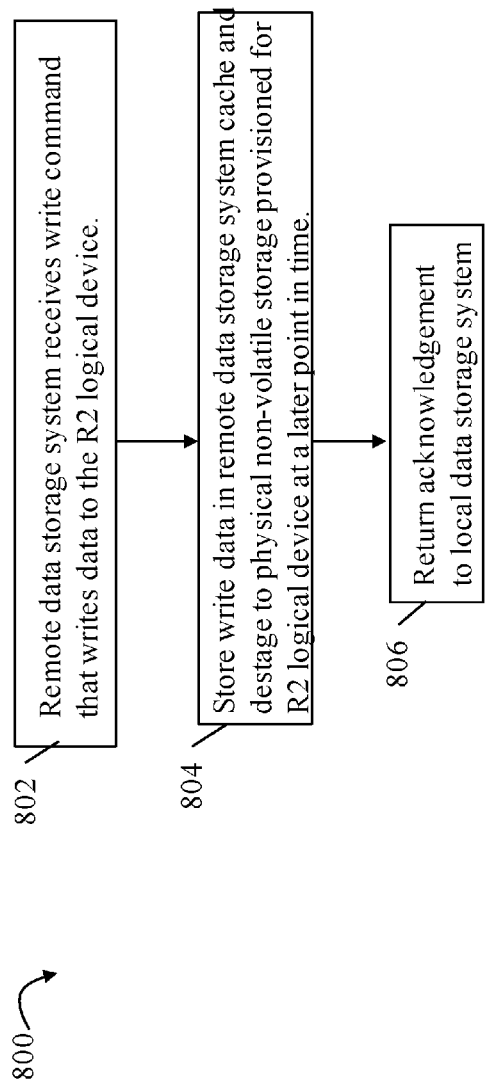

What will now be described in connection with FIGS. 9-11 are flowcharts of processing steps that may be performed in an embodiment in accordance with techniques herein. The following flowcharts summarize processing described above.

Referring to FIG. 9, shown is flowchart 600 of processing steps that may be performed in an embodiment in accordance with techniques herein. The flowchart 600 may be performed by the host. At step 602, the host I/O driver receives a write operation that writes or modifies data storage on a local R1 logical device of a local data storage system. The R1 device may be configured for remote replication on a remote data storage system. At step 604, a determination is made as to whether the single write needs to be partitioned into multiple smaller writes. if step 604 evaluates to yes, control proceeds to step 606 to partition the single host write received into the multiple writes and then, in step 608, set the replication indicator for each of the writes in accordance with the one or more criteria used by the host in connection with determining whether to remotely replicate the write data of the write operation. Control proceeds to step 612. If step 604 evaluates to no, control proceeds to step 610 where the replication indicator is set for the single write in accordance with the one or more criteria used by the host in connection with determining whether to remotely replicate the write data of the write operation. From step 610, control proceeds to step 612.

At step 612 the one or more writes are issued to the local R1 logical device of the local data storage system. At step 614, an acknowledgement is returned to the requester of the write operation once the host receives acknowledgement regarding completion of the write from the local data storage system.

Consistent with discussion above, although not explicitly illustrated in FIG. 9, processing may also include collecting writes or modifications over a time period and then issuing the collective writes or modifications at a single point in time depending on the specified one or more criteria (e.g., such as in connection with criteria affecting replication decisions as related to scheduling, defining significant data modifications or writes, and the like).

Referring to FIG. 10, shown is flowchart 700 of processing steps that may be performed in an embodiment in accordance with techniques herein. The flowchart 700 may be performed by the local data storage system that includes the R1 logical device. At step 702, the local data storage system received the write command writing data to the R1 logical device. At step 704, the write command write data is stored in the cache of the local data storage system whereby the cache write data is then destaged to physical non-volatile storage provisioned for the R1 device at a later point in time. At step 706, a determination is made as to whether the write command indicates to remotely replicate the write data. If step 706 evaluates to no, control proceeds to step 708 to return an acknowledgement to the host regarding completion of the write operation. If step 706 evaluates to yes, control proceeds to step 710 where processing is performed to replicate the write to the remote data storage system. Step 710 may include issuing another write operation to the remote data storage system that writes the write data (as stored in the local system cache) to the remote data storage system. At step 712, an acknowledgement regarding completion of the write operation may be returned to the host. If the remote replication is synchronous replication, the acknowledgement is returned only after receiving another acknowledgement from the remote data storage system regarding completion of remote write. If the remote replication is asynchronous, the acknowledgement to the host may be returned without waiting for remote system acknowledgement regarding completion of the remote write.

Although not explicitly illustrated in FIG. 10, the local data storage system may remotely replicate a write to generally one or more remote data storage systems as discussed elsewhere herein (e.g., FIG. 8).

Referring to FIG. 11, shown is a flowchart 800 of processing steps that may be performed in an embodiment in accordance with techniques herein. The flowchart 800 may be performed by the remote data storage system, such as system 104 including the remote R2 logical device. At step 802, the remote data storage system receives the write command from the local data storage system (e.g., as sent in step 710) where the write command writes data to the R2 logical device. At step 804, the write data is stored in the remote data storage system's cache and destaged to physical non-volatile storage provisioned for the R2 logical device at a later point in time. At step 806, an acknowledgement is returned to the local data storage system regarding completion of the remote write operation received in step 802.

An embodiment may implement the techniques herein using code executed by a processor. For example, an embodiment may implement the techniques herein using code which is executed by a processor. As will be appreciated by those skilled in the art, the code may be stored on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing data replication comprising:
receiving, on a host, a write operation that writes first data to a target location on a first logical device having storage provisioned on a first data storage system;
determining, on the host and in accordance with one or more criteria, whether the first data is to be replicated on a second logical device on a second data storage system; and
issuing the write operation from the host to the first data storage system, wherein the write operation denotes whether to disable replication of the first data to the second logical device on the second data storage system, wherein an I/O driver on the host performs said determining and said issuing, and wherein the I/O driver performs first processing comprising:
determining, in accordance with the one or more criteria on the host, whether all the first data of the write operation is to be replicated to the second logical device of the second data storage system; and
responsive to determining, in accordance with the one or more criteria, that not all of the first data is to be replicated on the second logical device of the second data storage system, performing second processing by the I/O driver, said second processing including:
partitioning the write operation into a plurality of write operations each writing some of the first write data to the first logical device;
determining, in accordance with the one or more criteria, a set of one or more of the plurality of write operations each writing a portion of the first write data to the first logical device where the portion is not being replicated on the second logical device of the second data storage system; and
inserting an indicator into each write operation of the set denoting that replication is disabled for data written by said each write operation of the set whereby data of said each write operation of the set is not replicated on the second logical device of the second data storage system.

2. The method of claim 1, wherein the first logical device on the first data storage system is configured to have data automatically replicated on the second logical device of the second data storage system.

3. The method of claim 1, further comprising:
writing the first data to the target location on the first logical device on the first data storage system; and
determining, on the first data storage system in accordance with an indicator of the write operation previously set by the I/O driver of the host, whether to replicate the first data to the second logical device on the second data storage system.

4. The method of claim 3, further comprising:
responsive to determining to replicate the first data to the second logical device on the second data storage system, issuing another write operation from the first data storage system to the second data storage system, said another write operation writing the first data to the target location on the second logical device of the second data storage system.

5. The method of claim 1, further comprising:
sending the plurality of write operations from the host to the first data storage system; and
selectively replicating, on the second logical device on the second data storage system, data that is written by each of the plurality of write operations not included in the set.

6. The method of claim 5, wherein the I/O driver has a mapping indicating which portions of the logical device are selectively replicated.

7. The method of claim 1, wherein the one or more criteria include one or more predefined types of data for which data replication of the first logical device is selectively indicated as enabled or disabled.

8. The method of claim 7, wherein the predefined types of data include any one or more of: user data, metadata, paging data sets, dump data sets, work files, and temporary files.

9. The method of claim 8, wherein the one or more criteria indicate, for at least a first of the predefined types, to disable replication of data of the first logical device of the first data storage system to the second logical device of the second data storage system.

10. The method of claim 8, wherein the one or more criteria indicate to selectively enable or disable data replication for a specified portion of at least one of the predefined types of data.

11. The method of claim 10, wherein the one or more criteria indicate to selectively enable or disable data replication for any of: one or more user data files, one or more user file systems, one or more logical device portions, one or more specified extents or portions of a file, one or more particular data sets, one or more specified portions of metadata, data written by one or more specified applications, and data written by code executing on a particular operating system image on the host.

12. The method of claim 7, wherein the one or more criteria include a schedule denoting a frequency of when data written to specified portions of the first logical device are selectively replicated from the first logical device of the first data storage system to the second logical device of the second data storage system.

13. The method of claim 12, wherein the schedule indicates to replicate, at a single point in time, all data written to a particular portion of the first logical during a first time period.

14. The method of claim 13, further comprising:
monitoring a frequency of modifications made to the particular portion of the first logical device; and
modifying the schedule by adjusting, in accordance with said monitoring, a frequency of data replication of the particular portion of the first logical device.

15. The method of claim 7, wherein the one or more criteria includes at least a first criterion defining a significant data change for a particular portion of the first logical device, and the method includes:
enabling replication of the particular portion of the first logical device responsive to detecting the significant data change for the particular portion of the first logical device, and otherwise disabling replication of the particular portion of the first logical device.

16. The method of claim 1, wherein the second data storage system is one of a plurality of remote data storage systems and wherein the write operation is selectively replicated on one or more of the plurality of remote data storage systems in accordance with the one or more criteria.

17. A computer readable medium comprising code stored therein, that, when executed, performs a method of data replication comprising:
  receiving, on a host, a write operation that writes first data to a target location on a first logical device having storage provisioned on a first data storage system;
  determining, on the host and in accordance with one or more criteria, whether the first data is to be replicated on a second logical device on a second data storage system; and
  issuing the write operation from the host to the first data storage system, wherein the write operation denotes whether to disable replication of the first data to the second logical device on the second data storage system, wherein an I/O driver on the host performs said determining and said issuing, and wherein the I/O driver performs first processing comprising:
    determining, in accordance with the one or more criteria on the host, whether all the first data of the write operation is to be replicated to the second logical device of the second data storage system; and
    responsive to determining, in accordance with the one or more criteria, that not all of the first data is to be replicated on the second logical device of the second data storage system, performing second processing by the I/O driver, said second processing including:
      partitioning the write operation into a plurality of write operations each writing some of the first write data to the first logical device;
      determining, in accordance with the one or more criteria, a set of one or more of the plurality of write operations each writing a portion of the first write data to the first logical device where the portion is not being replicated on the second logical device of the second data storage system; and
      inserting an indicator into each write operation of the set denoting that replication is disabled for data written by said each write operation of the set whereby data of said each write operation of the set is not replicated on the second logical device of the second data storage system.

18. The computer readable medium of claim 17, wherein the write operation is received from an application executing on the host.

19. A system comprising:
  a processor; and
  a memory comprising code stored therein that, when executed, performs a method of performing data replication comprising:
    receiving, on a host, a write operation that writes first data to a target location on a first logical device having storage provisioned on a first data storage system;
    determining, on the host and in accordance with one or more criteria, whether the first data is to be replicated on a second logical device on a second data storage system; and
    issuing the write operation from the host to the first data storage system, wherein the write operation denotes whether to disable replication of the first data to the second logical device on the second data storage system, wherein an I/O driver on the host performs said determining and said issuing, and wherein the I/O driver performs first processing comprising:
  determining, in accordance with the one or more criteria on the host, whether all the first data of the write operation is to be replicated to the second logical device of the second data storage system; and
  responsive to determining, in accordance with the one or more criteria, that not all of the first data is to be replicated on the second logical device of the second data storage system, performing second processing by the I/O driver, said second processing including:
    partitioning the write operation into a plurality of write operations each writing some of the first write data to the first logical device;
    determining, in accordance with the one or more criteria, a set of one or more of the plurality of write operations each writing a portion of the first write data to the first logical device where the portion is not being replicated on the second logical device of the second data storage system; and
    inserting an indicator into each write operation of the set denoting that replication is disabled for data written by said each write operation of the set whereby data of said each write operation of the set is not replicated on the second logical device of the second data storage system.

* * * * *